(12) United States Patent
Shynn et al.

(10) Patent No.: US 11,079,042 B2
(45) Date of Patent: Aug. 3, 2021

(54) MOTOR VEHICLE COMPONENT DISPLACEMENT LIMITING SYSTEM AND METHOD

(71) Applicant: Ford Global Technologies, LLC, Dearborn, MI (US)

(72) Inventors: Matthew David George Shynn, Chelmsford (GB); Joel Lopez Berthier, Mexico City (MX)

(73) Assignee: Ford Global Technologies, LLC, Dearborn, MI (US)

( * ) Notice: Subject to any disclaimer, the term of this patent is extended or adjusted under 35 U.S.C. 154(b) by 161 days.

(21) Appl. No.: 16/546,779

(22) Filed: Aug. 21, 2019

(65) Prior Publication Data

US 2020/0072387 A1 Mar. 5, 2020

(51) Int. Cl.
*F16L 3/00* (2006.01)
*B60H 1/00* (2006.01)
*B60K 11/00* (2006.01)

(52) U.S. Cl.
CPC ............ *F16L 3/00* (2013.01); *B60H 1/00571* (2013.01); *B60K 11/00* (2013.01)

(58) Field of Classification Search
CPC ..... F16L 3/00; B60H 1/00571; B60Q 1/0483; B60Q 1/0408; B60Q 1/0491; B62D 21/152; F02M 35/10144; F02M 37/0017; F02M 37/007; B60K 15/01
USPC ..... 138/106; 248/75, 548; 62/239, 298, 299, 62/244; 296/187.03
See application file for complete search history.

(56) References Cited

U.S. PATENT DOCUMENTS

| 3,851,672 | A | * | 12/1974 | De Vincent | ............... F16L 3/01 |
| | | | | | 138/106 |
| 5,730,402 | A | * | 3/1998 | Sallen | ..................... F16L 3/127 |
| | | | | | 248/74.1 |
| 5,927,382 | A | | 7/1999 | Kokubo | |
| 6,240,738 | B1 | | 6/2001 | Kato et al. | |
| 6,830,075 | B1 | * | 12/2004 | McKinney | ............ F16L 3/1236 |
| | | | | | 138/106 |

(Continued)

FOREIGN PATENT DOCUMENTS

| AT | 516243 | 3/2016 |
| CN | 206749442 U | 12/2017 |

(Continued)

OTHER PUBLICATIONS

Extended European Search Report for Application No. 19192682.3 dated Jan. 29, 2020.

*Primary Examiner* — Patrick F Brinson
(74) *Attorney, Agent, or Firm* — Carlson, Gaskey & Olds, P.C.

(57) ABSTRACT

An ancillary system for a motor vehicle is provided. The system comprises a housing; a duct for carrying a fluid to or from the housing, wherein the duct comprises a duct portion and a connector portion connecting the duct to the housing, wherein the duct portion is spaced apart from the housing in a first direction; and a spacer, the spacer being coupled to one of the duct and the housing and arranged between the duct and the housing to reduce a dimension of a gap between the duct and the housing in the first direction, and thereby reduce a displacement of the duct in the first direction during a collision. A motor vehicle assembly comprising the air ancillary system is also provided.

19 Claims, 4 Drawing Sheets

(56) References Cited

U.S. PATENT DOCUMENTS

| | | | |
|---|---|---|---|
| 7,594,583 B2* | 9/2009 | Whipple | B60K 15/04 220/86.2 |
| 8,464,546 B2* | 6/2013 | Minami | B60H 1/00571 62/239 |
| 8,899,533 B2* | 12/2014 | Lucas | B60T 17/046 248/75 |
| 10,035,415 B1* | 7/2018 | Koch | F02M 37/0017 |
| 2005/0205316 A1 | 9/2005 | Yamafuji | |
| 2008/0041084 A1 | 2/2008 | Minami | |
| 2011/0183095 A1 | 7/2011 | Defilippi | |
| 2015/0101696 A1* | 4/2015 | Ishiki | F02M 37/0017 138/103 |
| 2016/0040822 A1 | 2/2016 | Cetnar et al. | |
| 2017/0297450 A1 | 10/2017 | Nagaosa | |
| 2018/0076681 A1 | 3/2018 | Iketaka et al. | |
| 2018/0180046 A1 | 6/2018 | Momma et al. | |

FOREIGN PATENT DOCUMENTS

| | | |
|---|---|---|
| DE | 102012022366 | 6/2014 |
| JP | 2005104386 | 4/2005 |
| JP | 2015507567 A | 3/2015 |

* cited by examiner

Fig. 1

Prior Art

Fig. 2

Prior Art

MOTOR VEHICLE COMPONENT DISPLACEMENT LIMITING SYSTEM AND METHOD

CROSS-REFERENCE TO RELATED APPLICATIONS

This application claims priority to GB Patent Application No. 1814023.6, which was filed on 29 Aug. 2018 and is incorporated herein by reference in its entirety.

TECHNICAL FIELD

The present disclosure relates to a system for a motor vehicle and is particularly, although not exclusively, concerned with an air conditioning system with improved collision integrity.

BACKGROUND

Vehicles, such as motor vehicles, often comprise multiple ancillary systems, such as air conditioning system, heating systems, fuel systems, emissions control systems, etc. The ancillary systems are packaged on the vehicle in the spaces available between other vehicle systems and components.

When the ancillary systems comprise multiple components, the positions and orientations of each of the components of an ancillary system may be dictated by the sizes and shapes of other components of the vehicle, rather than the most desirable relative positions and orientations of the components.

The routing of connecting components, such as ducts and cables, between the components of the ancillary system is therefore dictated by the relative positions of the ancillary system components and the positions of the connections provided on them.

SUMMARY

According to an exemplary aspect of the present disclosure, there is provided an ancillary system, e.g., an air conditioning system, for a motor vehicle. The system includes a housing, a duct, and a spacer. The duct, e.g., a refrigerant duct, can be for carrying a fluid, e.g., refrigerant, to or from the housing. The duct can include a duct portion and a connector portion connecting the duct to the housing. The duct portion is spaced apart from the housing in a first direction. The spacer is coupled to one of the duct and the housing. The spacer, or portion thereof, is arranged between the duct and the housing to reduce a dimension of a gap between the duct and the housing in the first direction, e.g., reduce an area available for the refrigerant duct to be displaced into in the event of a collision of the motor vehicle. The spacer thereby reduces a displacement, e.g., a maximum possible displacement, of the duct in the first direction, e.g., towards the housing, during a collision.

The spacer may comprise an abutment face arranged to abut the other of the duct and the housing when the duct is displaced in the first direction. The abutment face may be angled relative to the first direction so as to encourage the duct to be displaced in a direction with a component perpendicular to the first direction, e.g., in a vertical and/or lateral direction, during the collision. For example, the abutment face may be angled, e.g., at an acute angle, relative to a plane perpendicular to the first direction.

The spacer may be integrally formed with the housing. For example, the spacer may comprise a rib formed on the housing. The spacer may protrude from a surface of the housing towards the duct, e.g., in a direction with a component towards a front of the motor vehicle, e.g., the first direction. In other words, the first direction may be a direction from the front of the vehicle towards the rear of the vehicle.

The spacer may be a forged, cast and/or machined component or feature. Alternatively, the spacer may be a fabricated component, such as a sheet metal component. For example, the spacer may comprise a sheet metal bracket. The spacer may be coupled to the duct. For example, the spacer may be coupled to the connector portion and/or the duct portion of the duct.

The spacer may comprise a body portion and a first flange coupled to the body portion. At least a portion of the first flange may be arranged between the duct and the housing. The first flange may thereby reduce the dimension of the gap between the duct and the housing in the first direction.

The spacer may comprise a second flange coupled to the body portion. The second flange may extend from the body portion in a direction with a component parallel to the first flange. The first and second flanges may extend in directions with components perpendicular to the first direction.

The body portion may extend between the first and second flanges in a direction with a component in the first direction. For example, the body portion may extend in a direction parallel with the first direction. The first and second flanges may be spaced apart from one another in the first direction. The duct portion may be arranged between the first and second flanges. In other words, the first and second flanges may be arranged on either side of the duct portion relative to the first direction. The body portion and the first and second flanges of the spacer may at least partially surround the duct portion on three sides of the duct portion. The second flange may be configured to couple to the connector portion of the duct.

The connector portion of the duct may be connected to a front face of the housing. The duct may extend across the spacer in a direction with a component in the lateral direction of the motor vehicle.

At least a portion of the spacer may be aligned with the duct portion of the duct in the lateral direction of the vehicle assembly.

The system may be an air conditioning system. The duct may be a refrigerant duct, e.g., for carrying a refrigerant. Additionally or alternatively, the housing may be a compressor casing of the air conditioning system.

According to another aspect of the present disclosure, there is provided an air conditioning system for a motor vehicle. The system includes a housing, a refrigerant duct, and a spacer. The refrigerant duct can be for carrying a refrigerant to or from the housing. The refrigerant duct can include a duct portion and a connector portion connecting the refrigerant duct to the housing. The duct portion can be spaced apart from the housing in a first direction. The spacer can be coupled to one of the refrigerant duct and the housing. At least a portion of the spacer is arranged between the refrigerant duct and the housing to reduce a dimension of a gap between the refrigerant duct and the housing in the first direction. The spacer thereby reduces a displacement of the refrigerant duct in the first direction during a collision. The spacer therefore acts to reduce shear loads on the duct portion in the event of a collision.

According to another aspect of the present disclosure, there is provided an ancillary system, e.g., an air conditioning system, for a motor vehicle, the system includes a housing, a duct, and a spacer. The duct, e.g., a refrigerant duct, can include a duct portion and a connector portion connecting the duct portion to the housing. The spacer can be arranged between the duct and the housing and configured to reduce displacement of the duct towards the housing in the event of a collision.

A motor vehicle assembly may comprise the above-mentioned ancillary system, e.g., the above-mentioned air conditioning system, and a displaceable component. The displaceable component may be spaced apart from the duct, e.g., the refrigerant duct, in the first direction. The displaceable component may be displaceable in the first direction during a collision of the motor vehicle, e.g., by virtue of the way in which the displaceable component is mounted in the motor vehicle assembly. The displaceable component may be a radiator of the motor vehicle.

The spacer may be at least partially aligned with a pinch point between the displaceable component and the housing, e.g., a point on the displaceable component closest to the housing before and/or after a collision, in a direction perpendicular to the first direction, e.g., in a lateral or vertical direction of the vehicle assembly.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Figure 1:
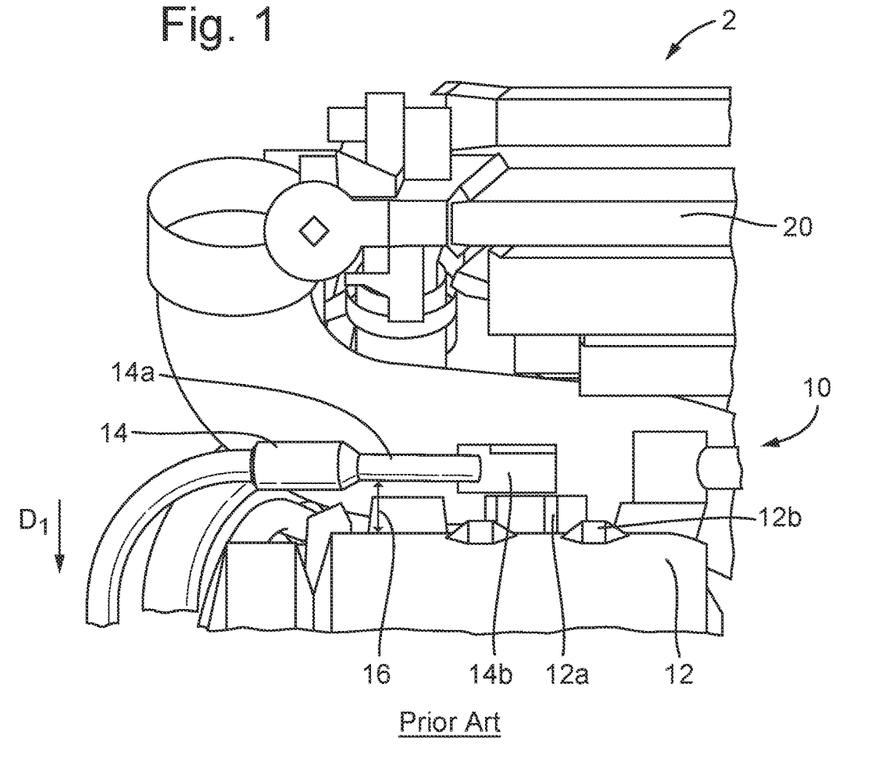
FIG. 1 is a schematic, plan view of a motor vehicle comprising an ancillary system of the prior art.

With reference to FIG. 1, a prior art vehicle assembly, such as a motor vehicle assembly 2 comprises an ancillary system, such as an air conditioning system 10 and a displaceable component, such as a radiator 20. The radiator 20 is mounted in the motor vehicle assembly 2 such that it can be displaced during a collision of the motor vehicle.

The air conditioning system 10 comprises a housing 12 and a duct 14 for carrying a fluid to and/or from the housing 12. As depicted in FIG. 1, the housing 12 is a compressor casing of the air conditioning system and the duct 14 is a refrigerant duct for carrying a refrigerant to or from the compressor during operation of the air conditioning system 10.

The duct 14 comprises a tubular duct portion 14a and a connector portion 14b for coupling the duct to the housing 12. The housing 12 comprises a port 12a, and the connector portion 14b is connected to the housing at the port 12a. In the arrangement shown, the duct portion 14a is manufactured from aluminum. However, in other arrangements, the duct portion 14a may be manufactured from any other desirable material.

In the motor vehicle assembly 2 depicted in FIG. 1, due to the positions of other components of the motor vehicle, the components of the air conditioning system 10 have been arranged such that the connector portion 14b connects to a front face 12b of the housing 12, e.g., which faces a front of the motor vehicle. In particular, the housing 12 is oriented such that the port 12a is arranged on the front face 12b of the housing 12. Furthermore, due to the positions of the other components of the air conditioning system, the duct portion 14a extends across, e.g., laterally across, the front face 12b of the housing 12 in order to reach another component of the air conditioning system 10, such as an expander (not shown).

As depicted in FIG. 1, a gap 16 may be present between the duct portion 14a and the housing 12. The gap 16 has a dimension in a first direction $D_1$ of the motor vehicle assembly 2, which is determined by the shape of the housing 12, and the direction in which the duct portion 14a extends across the front face of the housing. As shown, the first direction $D_1$ includes a component in a direction from the front of the motor vehicle assembly towards the rear of the motor vehicle assembly 2.

In FIG. 1, the displaceable component 20 comprises a radiator, which is provided in the vehicle assembly as part of a cooling system for an engine of the motor vehicle. The radiator 20 is spaced apart from the duct 14 of the air conditioning system 10 in the first direction $D_1$.

Figure 2:
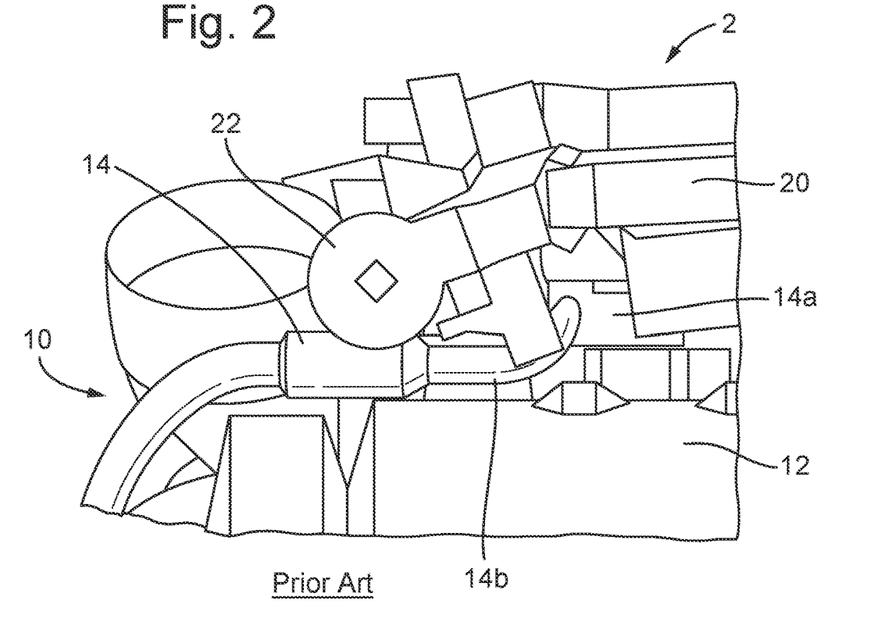
FIG. 2 is schematic, plan view of a motor vehicle comprising the ancillary system of FIG. 1 following a collision of the motor vehicle.

As depicted in prior art FIG. 2, during a collision, e.g., a frontal collision, of the motor vehicle, the radiator 20 is displaced in a direction with a component in the first direction $D_1$ towards the duct 14 and housing 12. A portion of the radiator 20, such as a drain cock 22, may contact the duct portion 14a and displace part of the duct portion 14a towards the housing 12, e.g., in the direction with a component in the first direction $D_1$. As shown, the part of the duct portion 14a that is displaced by the radiator 20 may be displaced until the duct portion 14a contacts the housing 12.

When the duct portion 14a is displaced by the radiator 20, at least part of the duct portion 14a may experience a strain. The strain, e.g., the maximum possible strain, experienced by the duct portion 114a during a collision, may depend on the size of the dimension of the gap 16 in the first direction $D_1$, prior to the collision. As depicted in FIG. 2, a part of the duct portion 14a adjacent to the connector portion 14b may experience the greatest magnitude of strain.

If the dimension of the gap 16 is sufficiently large to allow the duct portion 14a to be displaced a sufficiently large distance, e.g., as shown in FIG. 2, the strain experienced by at least the part of the duct portion 14a may be greater than a strain limit of the duct portion 14a, e.g., of the material from which the duct portion 14a is manufactured. In this case, the duct portion 14a may rupture, leading to the fluid being carried by the duct leaking out.

Figure 3:
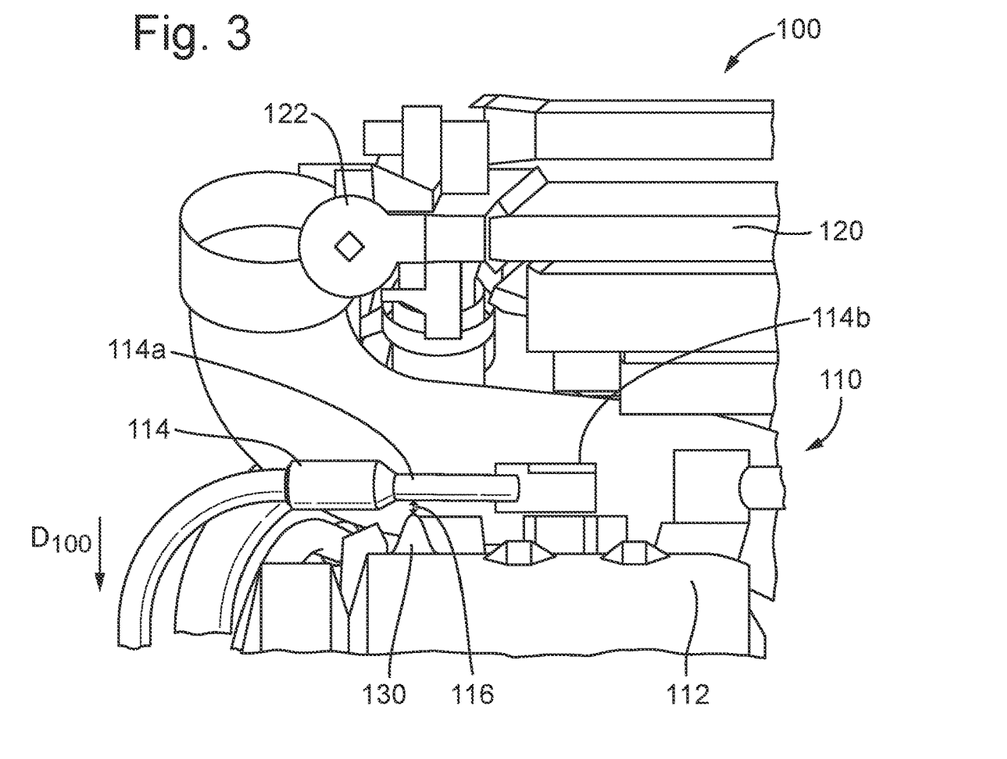
FIG. 3 is a schematic, plan view of a motor vehicle comprising an ancillary system according to an exemplary embodiment of the present disclosure.

With reference to FIG. 3, a vehicle assembly 100 according to an exemplary aspect of the present disclosure includes an air conditioning system 110 comprising a housing 112 and a duct 114, which can be similar to the housing 12 and duct 14 described above in connection with FIGS. 1 and 2.

In the embodiment shown in FIG. 3, the duct 114 comprises a tubular duct portion 114a and a connector portion 114b for coupling the duct 114 to the housing 112. The duct portion 114a extends across a front face 112a of the housing 112 and a gap 116 is present between the duct portion 114a and housing 112 having a dimension in a first direction $D_{100}$ of the vehicle assembly, which is a direction from the front to the rear of the vehicle assembly.

The vehicle assembly 100 further comprises a displaceable component, e.g., a radiator 120, that is mounted in the vehicle assembly. The radiator 120 can be similar to the radiator 20 described in connection with FIGS. 1 and 2. The radiator 120 can be mounted in the vehicle assembly 100, such that the radiator can be displaced in a direction with a component in the first direction $D_{100}$ during a collision, e.g., a frontal collision, of the vehicle.

The vehicle assembly 100 differs from the vehicle assembly 2 of FIGS. 1 and 2 due to, among other things, the inclusion of a spacer 130 provided in the vehicle assembly 100 such that at least a portion of the spacer 130 is arranged between the duct 114 and the housing 112.

Figure 4:
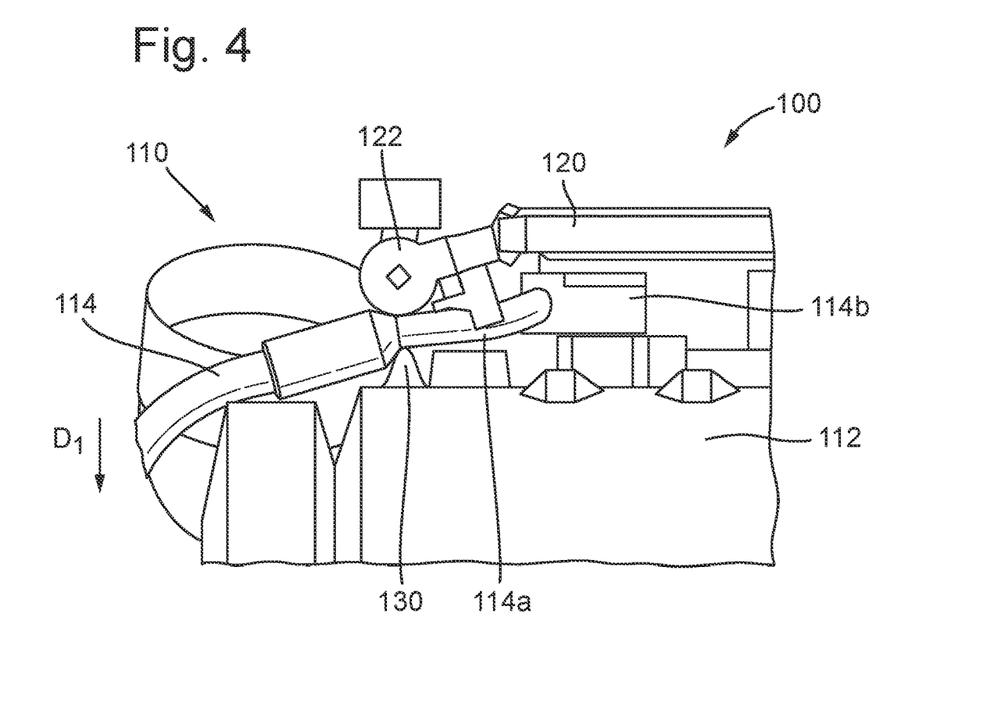
FIG. 4 is a schematic, plan view of a motor vehicle comprising the ancillary system shown in FIG. 3 following a collision of the motor vehicle.

As depicted in FIG. 4, the spacer 130 is coupled to the housing 112 such that at least a portion of the spacer 130 is aligned with the duct portion 114a, e.g., in a direction perpendicular to the first direction. The gap 116 is therefore formed between the spacer 130 and the duct portion 114a.

Figure 6:
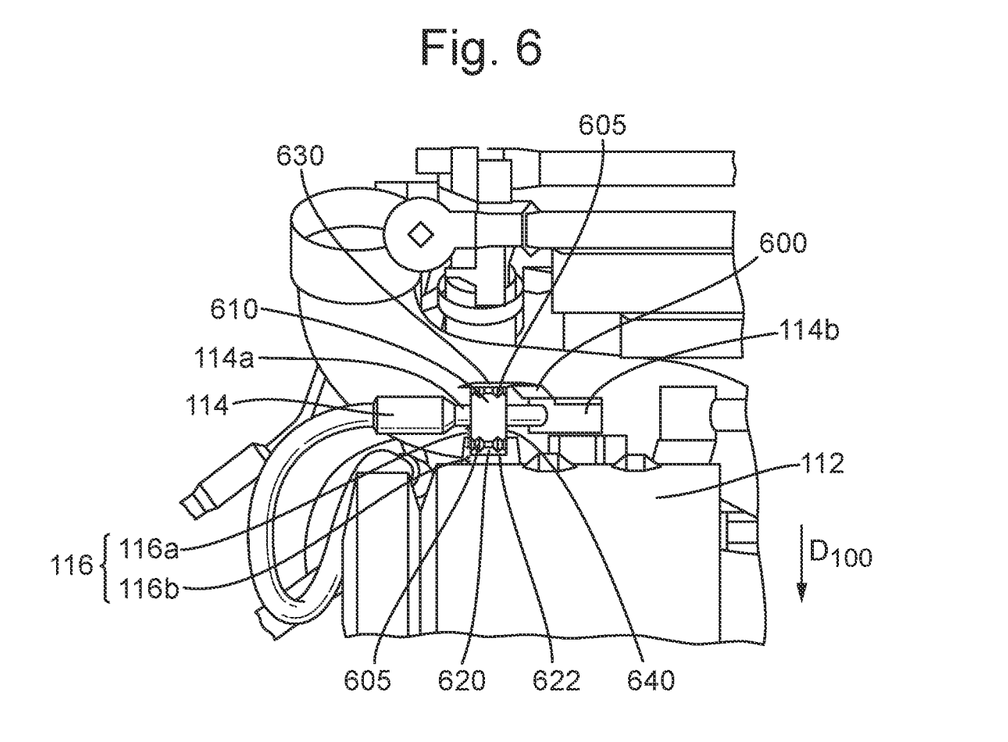
FIG. 6 is a schematic, plan view of a motor vehicle comprising an ancillary system according to another exemplary embodiment of the present disclosure.

In other arrangements, the spacer 130 may be coupled to the duct 114 and the gap 116 may be formed between the spacer 130 and the housing 112. Alternatively, the spacer 130 may be supported between the duct 114 and the housing 112 such that part of the gap 116 is formed between the duct 114 and the spacer 130, and part of the gap 116 is formed between the spacer 130 and the housing 112. For example, as shown in FIG. 6 and described below.

The spacer 130 reduces the dimension of the gap 116 in the first direction $D_{100}$, e.g., compared to arrangements in which the spacer 130 is not provided. The spacer 130 thereby reduces a maximum possible displacement of the duct 114 in the first direction $D_{100}$ during a collision, e.g., compared to the duct 14 shown in prior art FIGS. 1 and 2.

As depicted in FIG. 4, during a collision of the vehicle assembly 100, the radiator 120 is displaced such that a part of the radiator, e.g., a drain cock 122, contacts the duct portion 114a and displaces the duct portion 114a in a direction with a component in the first direction $D_{100}$. As shown, due to the presence of the spacer 130, the distance that the duct portion 114a can be displaced during a collision is reduced, which in turn reduces the strain, e.g., maximum possible strain, experienced by the duct portion 114a. In the arrangement shown in FIG. 4, the strain experienced by the duct portion 114a has been reduced below the strain limit of the duct portion 114a.

The spacer 130 may be sized such that the dimension of the gap 116 between the spacer and the duct 114 is greater than a minimum value. The minimum value may be set in order to prevent contact between the duct portion 114a and the spacer 130, and/or between the spacer 130 and the housing 112 during normal operation of the vehicle assembly 100. For example, the spacer 130 may be sized such that the dimension of the gap 116 is between 2 millimeters and 10 millimeters.

The spacer 130 may protrude from a surface of the housing 112 towards the duct 114 in a direction with a component in the first direction. The spacer 130 may be integrally formed with the housing 112 or the duct 114. In the arrangement shown in FIGS. 3 and 4, the housing 112 is a cast component and the spacer 130 is part of the casting. Additionally or alternatively, the spacer 130, e.g., the shape of the spacer 130, may be formed by a machining operation, e.g., a milling operation, performed after the housing has been cast. For example, the spacer 130 may comprise a cast and machined rib formed on the housing 112. In other arrangements, the spacer 130 may be coupled to the housing 112 or duct 114 using any other desirable permanent or temporary attachment method. For example, the spacer 130 may be welded, brazed, adhered or coupled to the housing 112 using fasteners, such as bolts and/or rivets.

Figure 5:
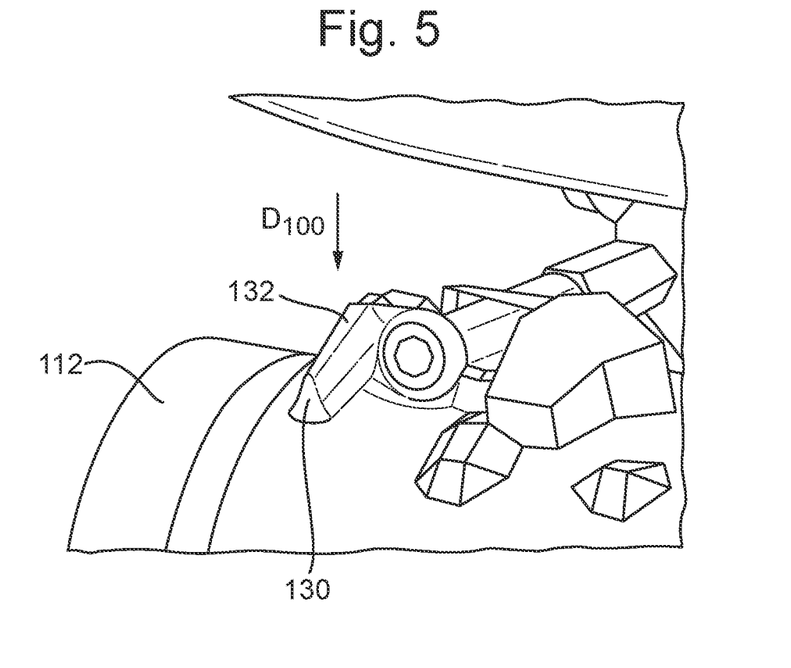
FIG. 5 is a perspective view of a housing of the ancillary system shown in FIG. 3.

With reference to FIG. 5, the spacer 130 may comprise an abutment face 132 arranged to abut the duct 114 when the duct 114 is displaced in the first direction, e.g., during a collision. The abutment face 132 is angled relative to the first direction $D_{100}$, so as to encourage the duct 114 to be displaced in a direction with a component perpendicular to the first direction $D_{100}$ during the collision, e.g., as the duct 114 is displaced towards the housing 112. The abutment face 132 may be arranged at a non-perpendicular angle to the first direction. For example, the abutment face 132 may be arranged at an acute angle relative to a plane perpendicular to the first direction $D_{100}$.

When the radiator 120 is displaced in the first direction $D_{100}$ during a collision, a pinch point may be formed between the radiator 120 and the housing 112. The pinch point may be a position at which a distance between the radiator 120 and the housing 112 is at a minimum, e.g., in the first direction $D_{100}$. Additionally, the pinch point may be the position at which the radiator 120 first contacts the housing 112 when the radiator 120 is displaced in the first direction $D_{100}$. As described above, when the radiator 120 is displaced towards the housing 112, a part of the radiator, e.g., the drain cock 122, may contact the duct 114. The pinch point may be formed between the part of the radiator that contacts the duct 114, and the housing 112.

As described above, the abutment face 132 may be angled so as to encourage the duct 114 to be displaced in a direction with a component perpendicular to the first direction $D_{100}$. In this way, the abutment face 132 may encourage the duct 114 to move away from the pinch point.

With reference to FIG. 6, in another exemplary embodiment of the present disclosure, a spacer 600 may comprise a fabricated component, e.g., fabricated sheet metal component, coupled to the duct 114. In the arrangement shown in FIG. 6, the spacer 600 is coupled to the connector portion 114b of the duct 114 using a welding process. However, in other arrangements, the spacer 600 may be coupled to the duct 114 using any other permanent or temporary attachment method, such as brazing, adhering or using one or more fasteners. Alternatively, the spacer 600 may be formed integrally with the connector portion 114b. In other arrangements, the spacer 600 may be coupled to, e.g., affixed to or integrally formed with, the duct portion 114a.

As shown in FIG. 6, the spacer 600 comprises a body portion 610 and a first flange 620 coupled to the body portion 610. The body portion 610 may be substantially planar or plate shaped. The body portion 610 may be formed, e.g., predominantly formed, in a plane substantially parallel with the first direction $D_{100}$. The first flange 620 may extend from the body portion in a direction with a component perpendicular to the first direction $D_{100}$. For example, the first flange 620 may extend substantially perpendicularly to the body portion 610.

The first flange 620 is arranged between the duct 114 and the housing 112. The presence of the first flange 620 thereby reduces the dimension of the gap 116 between the duct 114 and the housing 112 in the first direction $D_{100}$.

In the arrangement shown in FIG. 6, the first flange 620 is supported between the duct 114 and the housing 112 such that a first part 116a of the gap is formed between the duct 114 and the first flange 620 and a second part 116b of the gap is formed between the first flange 620 and the housing 112. The gap 116 may be considered to be the sum of the first and second parts of the gap 116a, 116b.

An abutment face 622 may be formed on a surface of the first flange 620 adjacent to the housing 112, e.g., the surface that abuts the housing 112 if the spacer 600 is displaced in the first direction $D_{100}$ in the event of a collision. The abutment face 622 may be angled relative to the first direction $D_{100}$, in the same way as the abutment face 132, so that the abutment face 622 encourages the spacer 600 to be displaced in a direction with a component perpendicular to the first direction $D_{100}$ when spacer 600 is displaced towards the housing 112.

Because the spacer 600 is coupled to the duct 114, the spacer 600 may be displaced together with the duct 114, e.g., if the duct 114 is displaced towards the housing 112 by the radiator 120. Additionally, the duct 114 may be displaced in the direction with a component perpendicular to the first direction $D_{100}$ due to the angled abutment face 622 of the first flange abutting the housing 112.

The spacer 600 may further comprise a second flange 630 coupled to the body portion 610 of the spacer. The second flange 630 may extend from the body portion 610 in a direction with a component parallel with the first flange 620. The first and second flanges 620, 630 may be spaced apart from one another in a direction with a component in the first direction $D_{100}$. The body portion 610 may extend between the first and second flanges 620, 630, e.g., in a direction with a component in the first direction $D_{100}$.

The first and second flanges 620, 630 may be configured such that the duct portion 114a is arranged between the first and second flanges 620, 630. In other words, the first and second flanges 620, 630 may be arranged on either side of the duct portion 114a in the first direction $D_{100}$. As depicted in FIG. 6, the body portion 610 and the first and second flanges 620, 630 of the spacer 600 may at least partially surround the duct portion 114a, e.g., on three sides of the duct portion 114a. The duct portion 114a may thereby be arranged within a space 640 formed between the body portion 610 and the first and second flanges 620, 630.

The second flange 630 may be configured such that at least a portion of the second flange 630 is arranged on an opposite side of the duct 114 to the housing 112 in the first direction $D_{100}$. Hence, at least a portion of the second flange 630 may be arranged between the duct 114 and the radiator 120.

Figure 7:
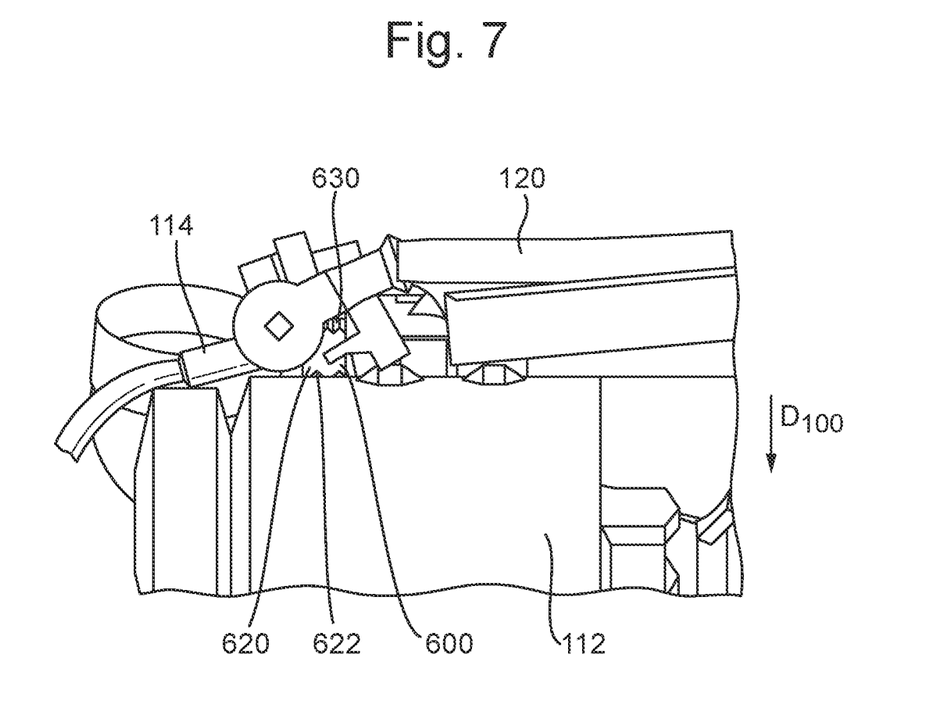
FIG. 7 is a schematic, plan view of a motor vehicle comprising the ancillary system shown in FIG. 6 following a collision of the motor vehicle.

With reference to FIG. 7, when the radiator 120 is displaced in the first direction $D_{100}$ during a collision, the radiator 120 may engage the second flange 630 of the spacer 600. Further displacement of the radiator 120 may therefore cause the spacer 600 and the duct 114 to be displaced in the first direction $D_{100}$, e.g., towards the housing 112.

As described above, when the abutment face 622 of the spacer 600 abuts the housing 112, the abutment face 622 may encourage the spacer 600 and duct 144 to be displaced in the direction perpendicular to the first direction $D_{100}$. When the spacer 600 and duct 144 are displaced in the direction perpendicular to the first direction $D_{100}$, the duct 114 may be displaced away from a pinch point between the radiator 120 and the housing 112. Additionally, when the spacer 600 and duct 144 are displaced in the direction perpendicular to the first direction $D_{100}$, the duct 114 may be displaced a sufficient distance such that the duct 114 is no longer displaced by the radiator 120 as it moves towards the housing 112.

As shown in FIG. 7, following the collision, the spacer 600 and duct 114 have been displaced by the radiator 120 rearwards towards the housing 112 and have also been displaced upwards by virtue of the abutment of the abutment face 622 against the housing 112. The duct 114 has thereby been displaced away from the pinch point between the radiator 120 and the housing 112. As depicted, the radiator 120 has continued displacing towards the housing 112 and has moved beneath the duct 114.

When the spacer 600 comprises the first and second flanges 620, 630 and the duct portion 114a is received within the space 640 formed between the first and second flanges 620, 630 and the body portion 610 of the spacer 600, the spacer and duct may be displaced away from the pinch point between the radiator and the housing to allow the radiator to pass the duct 114 without the space 640 being substantially reduced in size, e.g., due to deformation of the spacer 600. The spacer 600 may therefore also prevent the duct portion 114a being compressed or crushed during the collision.

As shown in FIG. 6, the body portion 610, the first flange 620 and/or the second flange 630 may comprise one or more stiffening features 605, such as ribs, webs, beads and/or swages, arranged to resist deformation of the spacer 600 in order to preserve the size of the space 640 during a collision.

As depicted, the second flange 630 may be configured to couple the spacer 600 to the duct 114, e.g., to the connector portion 114b of the duct. Additionally or alternatively, the body portion 610 of the spacer 600 may be configured to couple to the duct 114.

Although in the arrangements described above, the displaceable component comprises the radiator 120, in other arrangements, the displaceable component may comprise any other component mounted in the vehicle assembly such that it can be displaced in the first direction D100 towards the duct 114 and housing 112 during a collision.

Furthermore, although in the arrangements describe above, the ancillary system comprises the air conditioning system 10, in other arrangements, the ancillary system may comprise any other ancillary system of the vehicle comprising a duct for carrying fluid to or from a housing of the ancillary system.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. An ancillary system for a motor vehicle, the ancillary system comprising:
   a housing;
   a duct for carrying a fluid to or from the housing, wherein the duct comprises a duct portion and a connector portion connecting the duct to the housing, wherein the duct portion is spaced apart from the housing in a first direction; and
   a spacer, the spacer being coupled to one of the duct and the housing and arranged between the duct and the housing to reduce a dimension of a gap between the duct and the housing in the first direction, and thereby reduce a displacement of the duct in the first direction during a collision, wherein the spacer comprises an abutment face arranged to abut the other of the duct and the housing when the duct is displaced in the first direction, wherein the abutment face is angled relative to the first direction so as to encourage the duct to be displaced in a direction with a component perpendicular to the first direction during the collision.

2. The ancillary system of claim 1, wherein the spacer is integrally formed with the housing.

3. The ancillary system of claim 1, wherein the spacer comprises a rib integrally formed on the housing.

4. The ancillary system of claim 1, wherein the spacer protrudes from a surface of the housing towards the duct in a direction with a component towards a front of the motor vehicle.

5. The ancillary system of claim 1, wherein the spacer is coupled to the connector portion of the duct.

6. An ancillary system for a motor vehicle, the ancillary system comprising:
   a housing;
   a duct for carrying a fluid to or from the housing, wherein the duct comprises a duct portion and a connector portion connecting the duct to the housing, wherein the duct portion is spaced apart from the housing in a first direction; and
   a spacer, the spacer being coupled to one of the duct and the housing and arranged between the duct and the housing to reduce a dimension of a gap between the duct and the housing in the first direction, and thereby reduce a displacement of the duct in the first direction during a collision,
   wherein the spacer comprises a body portion and a first flange coupled to the body portion, wherein the first flange is arranged between the duct and the housing to reduce the dimension of the gap between the duct and the housing in the first direction,
   wherein the spacer comprises a second flange coupled to the body portion, wherein the second flange extends from the body portion in a direction with a component parallel to the first flange, such that the duct portion is arranged between the first and second flanges.

7. The ancillary system of claim 6, wherein the body portion extends between the first and second flanges in a direction with a component in the first direction.

8. The ancillary system of claim 1, wherein the connector portion of the duct is connected to a front face of the housing.

9. The ancillary system of claim 1, wherein the duct extends across the spacer in a direction with a component in the lateral direction of the motor vehicle, wherein the duct is a refrigerant duct.

10. The ancillary system of claim 1, wherein at least a portion of the spacer is aligned with the duct portion of the duct in the lateral direction of the motor vehicle, wherein the duct is a refrigerant duct.

11. The ancillary system of claim 1, wherein the system is an air conditioning system and wherein the duct is a refrigerant duct.

12. A motor vehicle assembly comprising the ancillary system of claim 1 and further comprising:
   a displaceable component, the displaceable component being spaced apart from the duct in the first direction, wherein the displaceable component is displaceable in the first direction during the collision of the motor vehicle.

13. The vehicle assembly of claim 12, wherein the spacer is aligned with a pinch point between the displaceable component and the housing in a direction perpendicular to the first direction.

14. The vehicle assembly of claim 12, wherein the displaceable component is a radiator.

15. A method of reducing displacement of a duct in an ancillary system of a motor vehicle, the method comprising:
   providing a duct for carrying a fluid to a housing, the duct including a duct portion and a connector portion connecting the duct to the housing, the duct portion is spaced apart from the housing in a first direction; and
   providing a spacer coupled to one of the duct and the housing and arranged between the duct and the housing, the spacer reduce a dimension of a gap between the duct and the housing in the first direction, the spacer configured to reduce a displacement of the duct in the first direction during a collision; and
   abutting an abutment face of the spacer against the other of the duct and the housing when the duct is displaced in the first direction during the collision, the abutment face angled relative to the first direction so as to encourage the duct to be displaced in a direction with a component perpendicular to the first direction during the collision.

16. The method of claim 15, further comprising reducing displacement of the duct during a collision by contacting the duct against the spacer.

17. The method of claim 15, further comprising moving a radiator to cause the displacement of the duct in the first direction.

18. The ancillary system of claim 1, wherein the abutment face is spaced a distance from the other of the duct and the housing.

19. The method of claim 15, wherein the abutting includes directly contacting the abutment face of the spacer against the other of the duct and the housing, the abutment face spaced from the other of the duct and the housing prior to the abutting.

* * * * *